United States Patent
Kao et al.

(10) Patent No.: US 8,222,176 B2
(45) Date of Patent: Jul. 17, 2012

(54) BIMETALLIC CATALYST, METHOD OF POLYMERIZATION AND BIMODAL POLYOLEFINS THEREFROM

(75) Inventors: Sun-Chueh Kao, Hillsboro, NJ (US); Michael D. Awe, Langhorne, PA (US)

(73) Assignee: Univation Technologies, LLC, Houston, TX (US)

(*) Notice: Subject to any disclaimer, the term of this patent is extended or adjusted under 35 U.S.C. 154(b) by 181 days.

(21) Appl. No.: 11/641,254

(22) Filed: Dec. 19, 2006

(65) Prior Publication Data

US 2007/0123414 A1    May 31, 2007

Related U.S. Application Data

(62) Division of application No. 10/677,390, filed on Oct. 2, 2003, now Pat. No. 7,172,987.

(60) Provisional application No. 60/437,410, filed on Dec. 31, 2002.

(51) Int. Cl.
- C08F 4/642 (2006.01)
- C08F 4/646 (2006.01)
- C08F 4/6592 (2006.01)
- B01J 31/22 (2006.01)

(52) U.S. Cl. ...................................................... 502/113

(58) Field of Classification Search .................. 502/113, 502/152, 115, 129; 526/114, 116, 124.6, 526/160, 943
See application file for complete search history.

(56) References Cited

U.S. PATENT DOCUMENTS

| | | | |
|---|---|---|---|
| 4,295,992 A * | 10/1981 | Gibbs | 502/112 |
| 4,312,783 A | 1/1982 | Sakurai et al. | 252/429 |
| 5,032,562 A | 7/1991 | Lo et al. | 502/111 |
| 5,266,544 A | 11/1993 | Tsutsui et al. | 502/113 |
| 5,525,678 A | 6/1996 | Mink et al. | 525/246 |
| 5,539,076 A * | 7/1996 | Nowlin et al. | 526/348.1 |
| 5,614,456 A | 3/1997 | Mink et al. | 502/115 |
| 5,726,332 A | 3/1998 | Eisch et al. | 556/1 |
| 5,798,314 A * | 8/1998 | Spencer et al. | 502/115 |
| 5,847,059 A | 12/1998 | Shamshoum et al. | 526/116 |
| 5,892,079 A | 4/1999 | Wilson | 556/11 |
| 5,986,024 A | 11/1999 | Wilson | 526/114 |
| 6,010,974 A | 1/2000 | Kim et al. | 502/152 |
| 6,096,677 A | 8/2000 | Wilson | 502/120 |
| 6,110,357 A | 8/2000 | Senn et al. | |
| 6,136,747 A | 10/2000 | Kao et al. | 502/158 |
| 6,143,844 A | 11/2000 | Hokkanen et al. | 526/114 |
| 6,153,776 A | 11/2000 | Patton et al. | 556/11 |
| 6,251,817 B1 | 6/2001 | Erickson et al. | 502/152 |
| 6,262,195 B1 | 7/2001 | Dall'Occo et al. | 526/113 |
| 6,365,537 B1 | 4/2002 | Windisch et al. | 502/117 |
| 6,372,868 B1 | 4/2002 | Szul et al. | 526/114 |
| 6,387,839 B1 | 5/2002 | Jin et al. | 502/113 |
| 6,410,474 B1 | 6/2002 | Nowlin et al. | 502/113 |
| 6,417,130 B1 | 7/2002 | Mink et al. | 502/113 |
| 6,420,298 B1 | 7/2002 | Mink et al. | 502/113 |
| 6,444,605 B1 | 9/2002 | Job et al. | 502/113 |
| 6,479,609 B1 | 11/2002 | Dall'Occo et al. | 526/352 |
| 6,486,089 B1 | 11/2002 | Kissin et al. | 502/104 |
| 6,566,450 B2 | 5/2003 | Debras et al. | 525/191 |
| 6,586,544 B2 | 7/2003 | Szul et al. | 526/160 |
| 6,605,560 B1 | 8/2003 | Chang | 502/104 |
| 6,624,266 B2 | 9/2003 | Terry et al. | 526/160 |
| 6,753,390 B2 | 6/2004 | Ehrman et al. | 526/113 |
| 6,825,287 B2 | 11/2004 | Mawson et al. | 526/60 |
| 6,833,416 B2 | 12/2004 | Kinnan et al. | 526/82 |
| 6,943,224 B2 | 9/2005 | Shih | 526/113 |
| 7,172,987 B2 | 2/2007 | Kao et al. | 502/117 |
| 2002/0022706 A1 | 2/2002 | MacDaniel et al. | 526/352 |
| 2002/0026018 A1 | 2/2002 | Agapiou | 526/127 |
| 2002/0028742 A1 | 3/2002 | Agapiou | 502/132 |
| 2004/0030070 A1 | 2/2004 | Loveday et al. | 526/160 |
| 2004/0044154 A1 | 3/2004 | Kuo et al. | 526/113 |
| 2004/0181016 A1 | 9/2004 | Agapiou | 526/82 |
| 2005/0038210 A1 | 2/2005 | Kuo et al. | 526/160 |
| 2005/0148744 A1 | 7/2005 | Kao | 526/114 |

FOREIGN PATENT DOCUMENTS

| | | |
|---|---|---|
| EP | 0436399 A2 | 10/1991 |
| WO | WO 98/34724 | 8/1998 |

* cited by examiner

Primary Examiner — Caixia Lu

(57) ABSTRACT

Bimetallic catalysts, and methods of producing a bimetallic catalyst comprising a modified Ziegler-Natta catalyst and a metallocene are provided, in one embodiment the method including combining: (a) a Ziegler-Natta catalyst comprising a Group 4, 5 or 6 metal halide and/or oxide, optionally including a magnesium compound, with (b) a modifier compound ("modifier"), wherein the modifier compound is a Group 13 alkyl compound, to form a modified Ziegler-Natta catalyst. Also provided is a method of olefin polymerization using the bimetallic catalyst of the invention. The modified Ziegler-Natta catalyst is preferably non-activated, that is, it is unreactive towards olefin polymerization alone. In one embodiment, the molar ratio of the Group 13 metal (of the modifier) to the Group 4, 5 or 6 metal halide and/or oxide is less than 10:1 in one embodiment. The bimetallic catalysts of the present invention are useful in producing bimodal polymers, particularly bimodal polyethylene, having a Polydispersity (Mw/Mn) of from 12 to 50. These bimodal polyolefins are useful in such articles as pipes and films.

6 Claims, No Drawings

_US 8,222,176 B2_

BIMETALLIC CATALYST, METHOD OF POLYMERIZATION AND BIMODAL POLYOLEFINS THEREFROM

CROSS REFERENCE TO RELATED APPLICATIONS

This application is a divisional application of Ser. No. 10/677,390, filed Oct. 2, 2003, now allowed, which claims the benefit of Ser. No. 60/437,410, filed Dec. 31, 2002, the disclosures of which are incorporated by reference in their entireties.

BACKGROUND

1. Field of Invention

The present invention relates to bimetallic catalysts, methods of producing these catalysts, and methods of polymerizing olefins using these bimetallic catalysts. More particularly, the present invention relates to a bimetallic catalyst including a modified Ziegler-Natta catalyst, and methods of producing bimodal polyolefins therefrom.

2. Description of Related Art

The polymerization processes described herein can be a solution, gas phase, slurry phase or high-pressure process. As discussed in greater detail below, gas phase or slurry phase polymerization processes are preferred, involving catalysts and olefin monomers, at least one of which is ethylene or propylene. As reflected in the patent literature, a great deal of effort has been expended towards discovering improvements in such processes. Some of those patents are identified herein. The improvements offered by the inventions described herein are set forth in greater detail below.

SUMMARY

One aspect of the present invention is directed to a method of producing a modified Ziegler-Natta catalyst, the method in one embodiment comprising combining: (a) a Ziegler-Natta catalyst comprising a Group 4, 5 or 6 metal halide and/or oxide, optionally including a magnesium compound, with (b) a modifier compound ("modifier"), wherein the modifier compound is a Group 13 alkyl compound or mixture of compounds, to form a modified Ziegler-Natta catalyst. The modified Ziegler-Natta catalyst is preferably non-activated, that is, it is unreactive towards olefin polymerization alone. In one embodiment, the modifier can be described by the formula $AlX_nR_{3-n}$, wherein Al is aluminum, X is independently selected from the group consisting of halides, preferably fluoride, chloride or bromide, $C_1$ to $C_{20}$ alkoxides, $C_1$ to $C_{20}$ alkylamides, and combinations thereof; and R is independently selected from the group consisting of $C_1$ to $C_{20}$ alkyls and $C_6$ to $C_{20}$ aryls; and wherein n is 0, 1, 2 or 3 in one embodiment, and in a particular embodiment, n is 1, 2 or 3; and further, wherein the modifier may be a blend of compounds described by the formula. In one embodiment, the molar ratio of the Group 13 metal (of the modifier) to the Group 4, 5 or 6 metal halide and/or oxide of the Ziegler-Natta catalyst is less than 10:1.

Another aspect of the present invention is a method of producing a bimetallic catalyst, the method comprising combining the a Ziegler-Natta catalyst and a second catalyst component, preferably a metallocene catalyst, to form the bimetallic catalyst; wherein the Ziegler-Natta catalyst may be modified before or after combining with the second catalyst component. The method of forming the bimetallic catalyst results in a bimetallic catalyst comprising a Ziegler-Natta catalyst component ("Ziegler-Natta catalyst") and a metallocene catalyst component ("metallocene catalyst") that can be supported on, for example, an inorganic oxide support and activated by, for example, use of an alumoxane and/or other aluminum alkyls.

The bimetallic catalysts of the present invention are useful in producing bimodal polyolefins, particularly bimodal polyethylene, having a Polydispersity (Mw/Mn) of from 12 to 30 and a value of Mz of from greater than 1,000,000 in one embodiment. The bimodal polyethylene may have other characteristics such as a density in the range of from 0.94 to 0.98 g/cc in a particular embodiment, and is preferably produced in a single reactor in one step. These bimodal polyolefins are useful in such articles as pipes, films, and blow molding applications (e.g., bottles, pails and other containers).

DETAILED DESCRIPTION

Introduction

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, structural formulas are employed as is commonly understood in the chemical arts; lines ("—") used to represent associations between a metal atom ("M", Group 3 to Group 12 atoms) and a ligand, ligand atom or atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

An aspect of the present invention is directed to a modified Ziegler-Natta catalyst, and a method of making the modified Ziegler-Natta catalyst. Another aspect of the present invention includes a bimetallic catalyst that comprises the modified Ziegler-Natta catalyst, and method of making the bimetallic catalyst. Polymerization processes disclosed herein involve contacting olefinic monomers with the bimetallic catalyst of the invention. The olefins and bimetallic catalyst may be contacted in one or more reactors, preferably in one reactor, to produce a polyolefin product as described herein. As used herein, the term "bimetallic catalyst" means any composition, mixture or system that includes at least two different catalyst compounds, at least one of which is a so called "modified Ziegler-Natta catalyst" as described herein. Each different catalyst can reside on a single support particle, so that the bimetallic catalyst is a supported bimetallic catalyst. However, as used herein, the term bimetallic catalyst also includes a system or mixture in which one of the catalysts components (e.g., the first catalyst compound) resides on one collection of support particles, and another catalyst (e.g., the second catalyst compound) resides on another collection of support particles. Preferably, in that latter instance, the two supported catalysts are introduced to a single reactor, either simultaneously or sequentially, and polymerization is conducted in the presence of the bimetallic catalyst, i.e., the two collections of supported catalysts.

Although a bimetallic catalyst can include more than two different catalysts, for purposes of discussing the invention herein, only two of those catalyst compounds are described in detail, i.e., the "first catalyst component" and the "second catalyst component," each discussed below. The first catalyst component is a modified Ziegler-Natta catalyst and the second catalyst component is a single site catalyst compound such as, for example, a metallocene catalyst compound. Other single site catalysts such as so called Group 15-containing catalyst compounds as disclosed in, for example, WO 99/01460; EP A1 0 893 454; EP A1 0 894 005; U.S. Pat. No. 5,318,935; U.S. Pat. No. 5,889,128 U.S. Pat. No. 6,333,389 B2 and U.S. Pat. No. 6,271,325 B1 may also be useful as the second catalyst component.

Various methods can be used to affix or bond one or two different catalysts to a support to form a bimetallic catalyst. For example, one procedure for preparing a supported bimetallic catalyst can include providing a supported first catalyst component, contacting a slurry including the first catalyst component and a non-polar hydrocarbon with a mixture (solution or slurry) that includes the second catalyst component, which may also include an activator. The procedure may further include drying the resulting product that includes the first and second catalyst components and recovering a bimetallic catalyst.

First Catalyst Component

The bimetallic catalysts described herein include a "first catalyst component," which is a modified Ziegler-Natta catalyst. Ziegler-Natta catalysts are well known in the art and described, for example, in ZIEGLER CATALYSTS 363-386 (G. Fink, R. Mulhaupt and H. H. Brintzinger, eds., Springer-Verlag 1995). Examples of such catalysts include those comprising Group 4, 5 or 6 transition metal oxides, alkoxides and chlorides (or combinations thereof), optionally in combination with a magnesium compound, internal and/or external electron donors, and support materials such as, for example, Group 13 and 14 inorganic oxides, as is known in the art and described in, for example, in POLYPROPYLENE HANDBOOK 12-44 (Edward P. Moore, Jr., ed., Hanser Publishers 1996) and, for example, U.S. Pat. No. 5,258,345.

In the present invention, the non-activated Ziegler-Natta catalyst is contacted with a "modifier" (described below) to form an non-activated modified Ziegler-Natta catalyst or "modified Ziegler-Natta catalyst", which is then combined with the second catalyst component, preferably a metallocene, to provide a bimetallic catalyst. In one embodiment, the Ziegler-Natta catalyst comprises a Group 4, 5 or 6 transition metal, preferably selected from Group 4 and 5, and more preferably titanium, even more preferably derived from a titanium chloride compound. In another embodiment, the Ziegler-Natta catalyst further comprises an organomagnesium compound. In certain embodiments of the invention, the modified Ziegler-Natta catalyst remains non-activated, both before and after making contact with the modifier, for example, until after the modified Ziegler-Natta catalyst is combined with the metallocene compound, and before polymerization is initiated. Desirably, the modified Ziegler-Natta catalyst component of the bimetallic catalyst remains non-activated until contacted with olefin monomers in a polymerization reactor.

The term "non-activated" means "not activated," "not active," or "inactive," preferably such that the catalyst is not (without further treatment or modification) capable of promoting polymerization when combined with monomers under polymerization conditions in a reactor. Preferably, an "non-activated" catalyst is one having either no activity; or an activity of less than 10 grams polymer per gram of catalyst. Alternatively, in at least certain embodiments, a "non-activated" catalyst is one having an activity of less than 100 grams polymer per gram of catalyst; and in other embodiments, an non-activated catalyst is one having an activity of less than 500 grams polymer per gram of catalyst. Those skilled in the art will recognize that the catalyst must be "activated" in some way before it is useful for promoting polymerization. As discussed below, activation is typically done by combining the catalyst compound (e.g., a Ziegler-Natta catalyst) with an "activator." Although the methods described herein also include various activation steps, for example, combining a catalyst with an activator such as TMA and water, those activation steps are not to be confused with catalyst "modification" as described herein. Whereas the former results in an activated catalyst, the latter does not result in an activated catalyst, even though the modifiers described herein have been used as co-catalysts or activators in other compositions or processes.

In one embodiment, the "modifier" recited herein is any compound or blend of compounds that includes at least one Group 13 metal, preferably aluminum or boron, and an alkyl group (or alkoxy or alkylamide group). In one embodiment, the modifier can be described by the formula $AlX_nR_{3-n}$, wherein Al is aluminum, X is independently selected from the group consisting of halides, preferably fluoride, chloride or bromide, $C_1$ to $C_{20}$ alkoxides, $C_1$ to $C_{20}$ alkylamides, and combinations thereof; and R is independently selected from the group consisting of $C_1$ to $C_{20}$ alkyls and $C_6$ to $C_{20}$ aryls; and wherein n is 0, 1, 2 or 3 in one embodiment, and in a particular embodiment, n is 1, 2 or 3, and in yet a more particular embodiment, n is 1 or 2; and wherein the modifier can be a blend of two or more compounds described by the formula. For example, the modifier, as used herein, may comprise a blend of diethylaluminumchloride and ethylaluminumdichloride in any desirable ratio. The description of the modifier compound is not limited to its physical form, as it may be a neat liquid, a solution comprising a suitable diluent, a slurry in a diluent, or dry solid. In a particular embodiment the modifier includes at least one halide group. In another embodiment of the modifier, the modifier comprises aluminum compounds of ethyl or butyl, and at least one chloride. Non-limiting examples of suitable modifiers include diethyl aluminum chloride (DEAC), ethylaluminum sesquichloride (EASC), diethylaluminum ethoxide (DEAL-E), and mixtures thereof.

Other non-limiting examples of modifiers include: methylaluminum dichloride, ethylaluminum dichloride, isobutylaluminum dichloride, n-octylaluminum dichloride, methylaluminum sesquichloride, ethylaluminum sesquichloride, ethylaluminum sesquibromide, isobutylaluminum sesquichloride, dimethylaluminum chloride, diethylaluminum chloride, diethylaluminum bromide, diethylaluminum iodide, di-n-propylaluminum chloride, di-n-butylaluminum chloride, diisobutylaluminum chloride, di-n-octylaluminum chloride, diethylaluminum ethoxide, diisobutylaluminum ethoxide, bis(diisobutylaluminum) oxide, diethylboron methoxide, dimethylboron chloride, diethylboron chloride, di-n-butylboron chloride, di-iso-butylboron chloride, and mixtures thereof.

Preferably, the molar ratio of the Group 13 metal to the transition metal (in the Ziegler-Natta catalyst) is less than 10:1. It is contemplated that amounts of modifier represented by a molar ratio of 10:1 or above may cause activation of the catalyst to occur, which is undesirable. A catalyst that becomes activated cannot be stored for any appreciable period of time without suffering from degradation. For example, an activated catalyst may begin to degrade after only 1 week of storage. In certain embodiments of the method, the molar ratios of the Group 13 metal in the modifier to the transition metal in the Ziegler-Natta catalyst fall within certain ranges, for example, having upper limits of 7:1; or 5:1; or 4:1; or 3:1; or even 2:1; and lower limits of 0.01:1, or 0.1:1 or 1:1, wherein the ranges can extend from any combination of any of the foregoing lower limits to any of the foregoing upper limits. When the modifier includes chlorine, it is preferable that the level of modifier have a molar ratio of 5:1 or less because of the corrosivity of chlorine.

The order in which the modifier and/or activator contacts the Ziegler-Natta catalyst is selected so that the highest catalyst activity (or productivity) is achieved. In one embodiment, the modifier is first contacted with a non-activated Ziegler-Natta catalyst, followed by (with or without isolation of the product) contacting the modified non-activated Ziegler-Natta catalyst with an activator. In another embodiment, the Ziegler-Natta catalyst is contacted simultaneously with the modifier and activator. In a particular aspect of this latter embodiment, the activator is trimethylaluminum (TMA), and in yet a more particular embodiment of the latter embodiment, the modifier excludes TMA. In any of these embodiments, the Ziegler-Natta catalyst or modified Ziegler Natta catalyst may be supported on a support material.

The phrase "isolation of the product" means, for example, removing diluents used during preparation of the product (for example, the Ziegler-Natta catalyst) that are not necessary for the final catalyst composition.

In yet another more particular embodiment, the Ziegler-Natta catalyst is first supported, for example, affixed to a support such as an inorganic oxide, silica in one embodiment. This supported Ziegler-Natta catalyst may be combined with an organomagnesium compound in another embodiment, in any desirable order. The non-activated supported Ziegler-Natta catalyst is then combined with a second catalyst compound, followed by (with or without isolating the product) contacting with the modifier. In an alternate embodiment, the non-activated supported Ziegler-Natta catalyst is first contacted with the modifier to form the modified Ziegler-Natta catalyst (with or without isolation of the product) followed by contacting with the second catalyst component. The second catalyst component is preactivated in one embodiment, and in another embodiment, activated after combining with the supported Ziegler-Natta catalyst. The resultant product is the bimetallic catalyst.

In one embodiment, the resultant bimetallic catalyst comprises a support material, a modified Ziegler-Natta catalyst, and an activator suitable for the metallocene such as, for example, an alumoxane, tris-arylborane or a ionic borate activator known in the art.

In an embodiment of the bimetallic catalyst, an activator suitable for activating the metallocene, such as an alumoxane, is added simultaneously with the metallocene to the supported modified Ziegler-Natta catalyst. The Ziegler-Natta catalyst or modified Ziegler-Natta catalyst is then activated in one embodiment by contacting aluminum alkyl compound, for example trimethylaluminum (TMA), with the bimetallic catalyst either directly prior to entering the polymerization reactor, or after entering the polymerization reactor. Preferably, an amount of water is also added to the polymerization reactor as well, in any suitable manner, to effectuate the activation of the modified Ziegler-Natta component. In yet another embodiment, the modifier and activator, preferably TMA, are added simultaneously to the non-activated, preferably supported, Ziegler-Natta catalyst. In a more particular embodiment, a supported bimetallic catalyst comprising the non-activated Ziegler-Natta catalyst is combined either prior to entering the polymerization reactor or in the polymerization reactor with an amount of TMA sufficient to activate the Ziegler-Natta catalyst simultaneous with the addition of a modifier compound excluding TMA, the modifier added in an amount of less than a molar ratio of 10:1 aluminum of modifier-to-transition metal of Ziegler-Natta catalyst.

As described above, the Ziegler-Natta catalyst may be supported. A specific embodiment of forming the Ziegler-Natta catalyst includes contacting a support material, for example an inorganic oxide such as alumina or silica, with an organomagnesium compound that includes at least one alkyl group to form a supported organomagnesium compound; then contacting the supported organomagnesium compound with a Group 4, 5 or 6 transition metal halide, alkoxide or oxide to form an non-activated Ziegler-Natta catalyst; then contacting the non-activated Ziegler-Natta catalyst thus formed with an effective amount of a modifier as described above, in one embodiment modifiers such as diethylaluminum chloride (DEAC) or ethylaluminum sesquichloride (EASC) or diethylaluminum ethoxide (DEAL-E), or blends thereof, to form a modified Ziegler-Natta catalyst.

The organomagnesium compound that is optionally present in the Ziegler-Natta catalyst and/or the modified Ziegler-Natta catalyst can be represented by the formula RMgR', where R' and R are the same or different $C_2$-$C_{12}$ alkyl groups, or $C_4$-$C_{10}$ alkyl groups, or $C_4$-$C_8$ alkyl groups. In another embodiment, Ziegler-Natta catalyst is formed by contacting an organomagnesium compound with a Group 4 or 5 oxide, alkoxide or halide compound, preferably a titanium chloride compound, wherein the organomagnesium compound has the formula $Mg(OR)_2$ or $R^1{}_m MgR^2{}_n$; where R, $R^1$, and $R^2$ are $C_1$ to $C_8$ alkyl groups, and m and n are 0, 1 or 2.

The Ziegler-Natta catalyst can be combined with, placed on or otherwise affixed to the support or carrier in a variety of ways, either prior to or after modification of the Ziegler-Natta catalyst. Preferably, the first catalyst component is affixed to the support prior to modification of the first catalyst component. In one of those ways, the support material is mixed with a non-polar hydrocarbon solvent to form a support slurry. The support slurry is contacted with an organomagnesium compound in one embodiment, which preferably then dissolves in the non-polar hydrocarbon of the support slurry to form a solution from which the organomagnesium compound is then deposited onto the carrier.

Preferably, the amount of organomagnesium compound included in the support slurry is only that which will be deposited, physically or chemically, onto the support, e.g., being affixed to the hydroxyl groups on the support, and no more than that amount, since any excess organomagnesium compound may cause undesirable side reactions during later polymerizations. Routine experimentation can be used to determine the optimum amount of organomagnesium compound in the support slurry. For example, the organomagnesium compound can be added to the slurry while stirring the slurry, until the organomagnesium compound is detected in the support solvent. Alternatively, the organomagnesium compound can be added in excess of the amount that is deposited onto the support, in which case any undeposited excess amount can be removed by filtration and washing. The amount of organomagnesium compound (in moles) based on the amount of dehydrated silica (in grams) ranges from 0.2 mmol/g to 2.0 mmol/g.

In one embodiment the support slurry, optionally including the organomagnesium compound, is contacted with an electron donor, such as tetraethylorthosilicate (TEOS) or an organic alcohol having the formula R"OH, where R" is a $C_1$-$C_{12}$ alkyl group, or a $C_1$ to $C_8$ alkyl group, or a $C_2$ to $C_4$ alkyl group, and/or an ether or cyclic ether such as tetrahydrofuran. In a particular embodiment, R"OH is n-butanol. The amount of organic alcohol is preferably used in an amount effective to provide an R"OH:Mg mol/mol ratio of from 0.2 to 1.5, or from 0.4 to 1.2, or from 0.6 to 1.1, or from 0.9 to 1.0.

The support slurry including the organomagnesium compound and the organic alcohol can then be contacted with transition metal compound to form the Ziegler-Natta catalyst. Suitable transition metal compounds are compounds of Group 4, 5 or 6 metals that are soluble in the non-polar hydrocarbon used to form the support slurry. Non-limiting examples of transition metal compounds include, for example, titanium and vanadium halides, oxyhalides or alkoxyhalides, such as titanium tetrachloride (TiCl$_4$), vanadium tetrachloride (VCl$_4$) and vanadium oxytrichloride (VOCl$_3$), and titanium and vanadium alkoxides, wherein the alkoxide moiety has a branched or unbranched alkyl group of 1 to 20 carbon atoms, preferably 1 to 6 carbon atoms. Mixtures of such transition metal compounds may also be used. The amount of non-metallocene transition metal compound used is sufficient to give a transition metal to magnesium mol/mol ratio of from 0.3 to 1.5, or from 0.5 to 0.8.

In one embodiment of the invention, a Ziegler-Natta catalyst comprising a Group 4, 5 or 6 metal in one embodiment is first prepared, followed by contacting with the modifier without isolating the Ziegler-Natta catalyst prior to contacting with the modifier. This is an in situ process whereby, for example, a modifier such as described herein, in a particular embodiment an aluminum alkyl, is combined with the Ziegler-Natta catalyst while still as a slurry in the diluent used to make the Ziegler-Natta catalyst.

Second Catalyst Component

A second catalyst component is combined with the Ziegler-Natta component to form a bimetallic catalyst. The Ziegler-Natta catalyst, modified or not, and the second catalyst component may be combined in any number of ways using techniques known to one skilled in the art. In particular, the Ziegler-Natta catalyst may first be combined with the second catalyst component followed by contacting with the modifier in one embodiment; and alternately, the Ziegler-Natta catalyst may be first contacted with the modifier, followed by contacting with the second catalyst component; wherein any embodiment may or may not include a support material. For example, the second catalyst component can be introduced to the support slurry including the modified Ziegler-Natta catalyst. The solvent in the support slurry can then be removed in a conventional manner, such as by evaporation or filtering, to obtain the dry, supported bimetallic catalyst component.

In a preferred embodiment, the "second catalyst component" is a metallocene catalyst compound as described herein. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst compounds". The metallocene catalyst compound is supported on a support material in a particular embodiment as described further below, and is supported with the modified Ziegler-Natta catalyst in a desirable embodiment, and even more preferably, the metallocene is co-immobilized with the modified Ziegler-Natta catalyst and an activator compound capable of activating the metallocene.

The Cp ligands are one or more rings or ring system(s), at least a portion of which includes π-bonded systems, such as cycloalkadienyl ligands and heterocyclic analogues. The ring (s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof (as described in more detail below), and heterocyclic versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and a Ti, Zr, Hf atoms in yet a more particular embodiment, and Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I):

$$Cp^A Cp^B MX_n \qquad (I)$$

wherein M is as described above; each X is chemically bonded to M; each Cp group is chemically bonded to M; and n is 0 or an integer from 1 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) as well as ring substituents in structures (Va-d) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (I) through (V) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in the formula (I) above and for the formulas/structures (II) through (V) below is independently selected from the group consisting of: any leaving group in one embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment; and fluoride in yet a more particular embodiment.

Other non-limiting examples of X groups in formula (I) include amines, amido compounds, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more X's form a part of a fused ring or ring system.

In another aspect of the invention, the metallocene catalyst component includes those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes". $Cp^A$, $Cp^B$, M, X and n in structure (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $—Si(R')_2Si(R'_2)—$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

The position the bridging group is bound to each Cp is not limited, and in the case of indenyl or tetrahydroindenyl Cp ligands, the bridging group may be bound to either the so called "1" or "2" position along each ring, desirably the "1" position. While the structures in (Vc-f) show a particular position being bound to the bridging groups, this is only one embodiment and not meant to be limiting.

In another embodiment, bridging group (A) may also be cyclic, comprising, for example 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) are different from each other in one embodiment, and the same in another embodiment.

In yet another aspect of the invention, the metallocene catalyst components include bridged mono-ligand metallocene compounds (e.g., mono cyclopentadienyl catalyst components). In this embodiment, the at least one metallocene catalyst component is a bridged "half-sandwich" metallocene as in, for example, U.S. Pat. No. 5,055,438, represented by the formula (III):

$$Cp^4(A)QMX_n \quad (III)$$

wherein $Cp^4$ is defined above and is bound to M; (A) is a bridging group bonded to Q and $Cp^4$; and wherein an atom from the Q group is bonded to M; and n is 0 or an integer from 1 to 3; 1 or 2 in a particular embodiment. In formula (III) above, $Cp^4$, (A) and Q may form a fused ring system. The X groups and n of formula (III) are as defined above in formula (I) and (II). In one embodiment, $Cp^4$ is selected from the group consisting of cyclopentadienyl, indenyl, tetrahydroindenyl, fluorenyl, substituted versions thereof, and combinations thereof.

In formula (III), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen or sulfur atom in a more particular embodiment, and nitrogen and oxygen in yet a more particular embodiment. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds comprising Group 15 and Group 16 atoms capable of bonding with M.

In yet another aspect of the invention, the at least one metallocene catalyst component is an unbridged "half sandwich" metallocene represented by the formula (IVa):

$$Cp^4MQ_qX_n \quad (IVa)$$

wherein $Cp^A$ is defined as for the Cp groups in (I) and is a ligand that is bonded to M; each Q is independently bonded to M; Q is also bound to $Cp^A$ in one embodiment; X is a leaving group as described above in (I); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (IVa), Q is selected from the group consisting of $ROO^-$, $RO-$, $R(O)-$, $-NR-$, $-CR_2-$, $-S-$, $-NR_2$, $-CR_3$, $-SR$, $-SiR_3$, $-PR_2$, $-H$, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (IVb), such as described in, for example, U.S. Pat. No. 6,069,213:

$$Cp^4M(Q_2GZ)X_n \text{ or}$$

$$T(Cp^4M(Q_2GZ)X_n)_m \quad (IVb)$$

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of $-O-$, $-NR-$, $-CR_2-$ and $-S-$; G is either carbon or silicon; and Z is selected from the group consisting of R, $-OR$, $-NR_2$, $-CR_3$, $-SR$, $-SiR_3$, $-PR_2$, and hydride, providing that when Q is $-NR-$, then Z is selected from the group consisting of $-OR$, $-NR_2$, $-SR$, $-SiR_3$, $-PR_2$; and provided that neutral valency for Q is satisfied by Z; and wherein each R is independently selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n is 1 or 2 in a particular embodiment; and

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^4M(Q_2GZ)X_n$" groups, and is chemically bonded to the $Cp^4$ groups.

m is an integer from 1 to 7; m is an integer from 2 to 6 in a more particular embodiment.

In another aspect of the invention, the at least one metallocene catalyst component can be described more particularly in structures (Va), (Vb), (Vc), (Vd) (Ve) and (Vf):

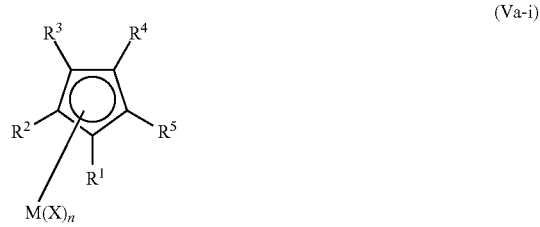

(Va-i)

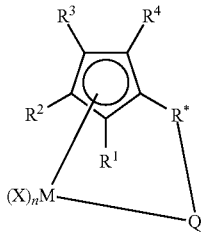

(Va-ii)

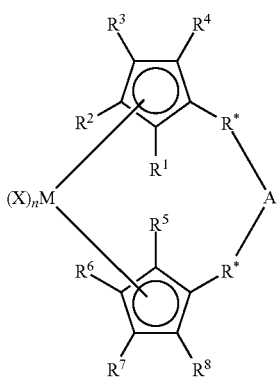

(Vb)

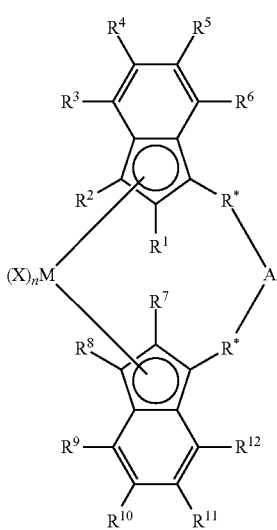

(Vc)

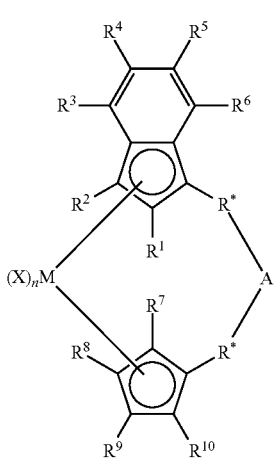

(Vd)

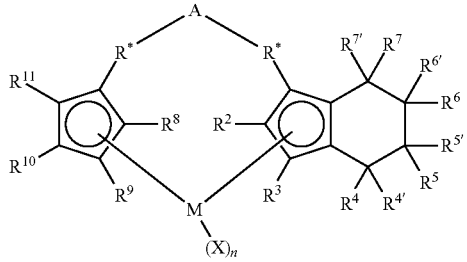

(Ve)

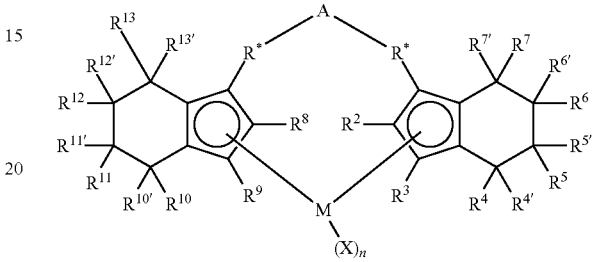

(Vf)

wherein in structures (Va) to (Vf) M is selected from the group consisting of Group 3 to Group 12 atoms, and selected from the group consisting of Group 3 to Group 10 atoms in a more particular embodiment, and selected from the group consisting of Group 3 to Group 6 atoms in yet a more particular embodiment, and selected from the group consisting of Group 4 atoms in yet a more particular embodiment, and selected from the group consisting of Zr and Hf in yet a more particular embodiment; and is Zr in yet a more particular embodiment;

wherein Q in (Va-ii) is selected from the group consisting of alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q comprise from 1 to 20 carbon atoms in one embodiment; and wherein the aromatic groups comprise from 5 to 20 carbon atoms in one embodiment;

wherein each R* is independently: selected from the group consisting of hydrocarbylenes and heteroatom-containing hydrocarbylenes in one embodiment; and selected from the group consisting of alkylenes, substituted alkylenes and heteroatom-containing hydrocarbylenes in another embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbylenes in a more particular embodiment; and selected from the group consisting of $C_1$ to $C_4$ alkylenes in yet a more particular embodiment; and wherein both R* groups are identical in another embodiment in structures (Vb-f);

A is as described above for (A) in structure (II), and more particularly, selected from the group consisting of a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, —$CH_2CH_2$—, =$CR_2$ and =$SiR_2$ in a more particular embodiment; wherein and R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment;

wherein A may be absent in yet another embodiment, in which case each R* is defined as for $R^1$-$R^{13}$;

each X is as described above in (I);

n is an integer from 0 to 4, and from 1 to 3 in another embodiment, and 1 or 2 in yet another embodiment; and $R^1$ through $R^{13}$ (and $R^{4'}$ through $R^{7'}$ and $R^{10'}$ through $R^{13'}$) are independently: selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylphenyl, and 4-tertiarybutylphenyl groups in yet a more particular embodiment; wherein adjacent R groups may form a ring, either saturated, partially saturated, or completely saturated.

The structure of the metallocene catalyst component represented by (Va) may take on many forms such as disclosed in, for example, U.S. Pat. No. 5,026,798, U.S. Pat. No. 5,703,187, and U.S. Pat. No. 5,747,406, including a dimer or oligomeric structure, such as disclosed in, for example, U.S. Pat. No. 5,026,798 and U.S. Pat. No. 6,069,213.

In a particular embodiment of the metallocene represented in (Vd), $R^1$ and $R^2$ form a conjugated 6-membered carbon ring system that may or may not be substituted.

Non-limiting examples of metallocene catalyst components consistent with the description herein include:
cyclopentadienylzirconium $X_n$,
indenylzirconium $X_n$,
(1-methylindenyl)zirconium $X_n$,
(2-methylindenyl)zirconium $X_n$,
(1-propylindenyl)zirconium $X_n$,
(2-propylindenyl)zirconium $X_n$,
(1-butylindenyl)zirconium $X_n$,
(2-butylindenyl)zirconium $X_n$,
(methylcyclopentadienyl)zirconium $X_n$,
tetrahydroindenylzirconium $X_n$,
(pentamethylcyclopentadienyl)zirconium $X_n$,
cyclopentadienylzirconium $X_n$,
pentamethylcyclopentadienyltitanium $X_n$,
tetramethylcyclopentyltitanium $X_n$,
1,2,4-trimethylcyclopentadienylzirconium $X_n$,
dimethylsilyl(1,2,3,4-tetramethylcyclopentadienyl)(cyclopentadienyl)zirconium $X_n$,
dimethylsilyl(1,2,3,4-tetramethylcyclopentadienyl)(1,2,3-trimethylcyclopentadienyl)zirconium $X_n$,
dimethylsilyl(1,2,3,4-tetramethylcyclopentadienyl)(1,2-dimethylcyclopentadienyl)zirconium $X_n$,
dimethylsilyl(1,2,3,4-tetramethyl-cyclopentadienyl)(2-methylcyclopentadienyl)zirconium $X_n$,
dimethylsilyl(cyclopentadienyl)(indenyl)zirconium $X_n$,
dimethylsilyl(2-methylindenyl)(fluorenyl)zirconium $X_n$,
diphenylsilyl(1,2,3,4-tetramethyl-cyclopentadienyl)(3-propylcyclopentadienyl)zirconium $X_n$,
dimethylsilyl (1,2,3,4-tetramethylcyclopentadienyl) (3-t-butylcyclopentadienyl)zirconium $X_n$,
dimethylgermyl(1,2-dimethylcyclopentadienyl)(3-isopropylcyclopentadienyl)zirconium dimethylsilyl(1,2,3,4-tetramethyl-cyclopentadienyl)(3-methylcyclopentadienyl) zirconium $X_n$,
diphenylmethylidene(cyclopentadienyl)(9-fluorenyl)zirconium $X_n$,
diphenylmethylidene(cyclopentadienyl)(indenyl)zirconium $X_n$,
iso-propylidenebis(cyclopentadienyl)zirconium $X_n$,
iso-propylidene(cyclopentadienyl)(9-fluorenyl)zirconium $X_n$,
iso-propylidene(3-methylcyclopentadienyl)(9-fluorenyl)zirconium $X_n$,
ethylenebis(9-fluorenyl)zirconium $X_n$,
meso-ethylenebis(1-indenyl)zirconium $X_n$,
ethylenebis(1-indenyl)zirconium $X_n$,
ethylenebis(2-methyl-1-indenyl)zirconium $X_n$,
ethylenebis(2-methyl-4,5,6,7-tetrahydro-1-indenyl)zirconium $X_n$,
ethylenebis(2-propyl-4,5,6,7-tetrahydro-1-indenyl)zirconium $X_n$,
ethylenebis(2-isopropyl-4,5,6,7-tetrahydro-1-indenyl)zirconium $X_n$,
ethylenebis(2-butyl-4,5,6,7-tetrahydro-1-indenyl)zirconium $X_n$,
ethylenebis(2-isobutyl-4,5,6,7-tetrahydro-1-indenyl)zirconium $X_n$,
dimethylsilyl(4,5,6,7-tetrahydro-1-indenyl)zirconium $X_n$,
diphenyl(4,5,6,7-tetrahydro-1-indenyl)zirconium $X_n$,
ethylenebis(4,5,6,7-tetrahydro-1-indenyl)zirconium $X_n$,
dimethylsilylbis(cyclopentadienyl)zirconium $X_n$,
dimethylsilylbis(9-fluorenyl)zirconium $X_n$,
dimethylsilylbis(1-indenyl)zirconium $X_n$,
dimethylsilylbis(2-methylindenyl)zirconium $X_n$,
dimethylsilylbis(2-propylindenyl)zirconium $X_n$,
dimethylsilylbis(2-butylindenyl)zirconium $X_n$,
diphenylsilylbis(2-methylindenyl)zirconium $X_n$,
diphenylsilylbis(2-propylindenyl)zirconium $X_n$,
diphenylsilylbis(2-butylindenyl)zirconium $X_n$,
dimethylgermylbis(2-methylindenyl)zirconium $X_n$,
dimethylsilylbis(tetrahydroindenyl)zirconium $X_n$,
dimethylsilylbis(tetramethylcyclopentadienyl)zirconium $X_n$,
dimethylsilyl(cyclopentadienyl)(9-fluorenyl)zirconium $X_n$,
diphenylsilyl(cyclopentadienyl)(9-fluorenyl)zirconium $X_n$,
diphenylsilylbis(indenyl)zirconium $X_n$,
cyclotrimethylenesilyl(tetramethylcyclopentadienyl)(cyclopentadienyl)zirconium $X_n$,
cyclotetramethylenesilyl(tetramethylcyclopentadienyl)(cyclopentadienyl)zirconium $X_n$,
cyclotrimethylenesilyl(tetramethylcyclopentadienyl)(2-methylindenyl)zirconium $X_n$,
cyclotrimethylenesilyl(tetramethylcyclopentadienyl)(3-methylcyclopentadienyl)zirconium $X_n$,
cyclotrimethylenesilylbis(2-methylindenyl)zirconium $X_n$,
cyclotrimethylenesilyl(tetramethylcyclopentadienyl)(2,3,5-trimethylcyclopentadienyl)zirconium $X_n$,
cyclotrimethylenesilylbis(tetramethylcyclopentadienyl)zirconium $X_n$, dimethylsilyl(tetramethylcyclopentadieneyl)(N-tert-butylamido)titanium $X_n$,
bis(cyclopentadienyl)chromium $X_n$,
bis(cyclopentadienyl)zirconium $X_n$,
bis(n-butylcyclopentadienyl)zirconium $X_n$,
bis(n-dodecylcyclopentadienyl)zirconium $X_n$,
bis(ethylcyclopentadienyl)zirconium $X_n$,
bis(iso-butylcyclopentadienyl)zirconium $X_n$,
bis(iso-propylcyclopentadienyl)zirconium $X_n$,
bis(methylcyclopentadienyl)zirconium $X_n$,
bis(n-oxtylcyclopentadienyl)zirconium $X_n$,
bis(n-pentylcyclopentadienyl)zirconium $X_n$,
bis(n-propylcyclopentadienyl)zirconium $X_n$,
bis(trimethylsilylcyclopentadienyl)zirconium $X_n$,
bis(1,3-bis(trimethylsilyl)cyclopentadienyl)zirconium $X_n$,
bis(1-ethyl-2-methylcyclopentadienyl)zirconium $X_n$,
bis(1-ethyl-3-methylcyclopentadienyl)zirconium $X_n$,
bis(pentamethylcyclopentadienyl)zirconium $X_n$,
bis(pentamethylcyclopentadienyl)zirconium $X_n$,
bis(1-propyl-3-methylcyclopentadienyl)zirconium $X_n$,
bis(1-n-butyl-3-methylcyclopentadienyl)zirconium $X_n$,
bis(1-isobutyl-3-methylcyclopentadienyl)zirconium $X_n$,
bis(1-propyl-3-butylcyclopentadienyl)zirconium $X_n$,
bis(1,3-n-butylcyclopentadienyl)zirconium $X_n$,
bis(4,7-dimethylindenyl)zirconium $X_n$,
bis(indenyl)zirconium $X_n$,
bis(2-methylindenyl)zirconium $X_n$,
cyclopentadienylindenylzirconium $X_n$,
bis(n-propylcyclopentadienyl)hafnium $X_n$,
bis(n-butylcyclopentadienyl)hafnium $X_n$,
bis(n-pentylcyclopentadienyl)hafnium $X_n$,
(n-propyl cyclopentadienyl)(n-butyl cyclopentadienyl) hafnium $X_n$,
bis[(2-trimethylsilylethyl)cyclopentadienyl]hafnium $X_n$,
bis(trimethylsilyl cyclopentadienyl)hafnium $X_n$,
bis(2-n-propylindenyl)hafnium $X_n$,
bis(2-n-butylindenyl)hafnium $X_n$,
dimethylsilylbis(n-propylcyclopentadienyl)hafnium $X_n$,
dimethylsilylbis(n-butylcyclopentadienyl)hafnium $X_n$,
bis(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$,
dimethylsilyl(tetramethylcyclopentadienyl)(cyclopropylamido)titanium $X_n$,
dimethylsilyl(tetramethyleyclopentadienyl)(cyclobutylamido)titanium $X_n$,
dimethylsilyl(tetramethyleyclopentadienyl)(cyclopentylamido)titanium $X_n$,
dimethylsilyl(tetramethylcyclopentadienyl)(cyclohexylamido)titanium $X_n$,
dimethylsilyl(tetramethylcyclopentadienyl)(cycloheptylamido)titanium $X_n$,
dimethylsilyl(tetramethylcyclopentadienyl)(cyclooctylamido)titanium $X_n$,
dimethylsilyl(tetramethylcyclopentadienyl)(cyclononylamido)titanium $X_n$,
dimethylsilyl(tetramethylcyclopentadienyl)(cyclodecylamido)titanium $X_n$,
dimethylsilyl(tetramethylcyclopentadienyl)(cycloundecylamido)titanium $X_n$,
dimethylsilyl(tetramethylcyclopentadienyl)(cyclododecylamido)titanium $X_n$,
dimethylsilyl(tetramethylcyclopentadienyl)(sec-butylamido)titanium $X_n$,
dimethylsilyl(tetramethylcyclopentadienyl)(n-octylamido)titanium $X_n$,
dimethylsilyl(tetramethylcyclopentadienyl)(n-decylamido)titanium $X_n$,
dimethylsilyl(tetramethylcyclopentadienyl)(n-octadecylamido)titanium $X_n$,
methylphenylsilyl(tetramethylcyclopentadienyl)(cyclopropylamido)titanium $X_n$,
methylphenylsilyl(tetramethylcyclopentadienyl)(cyclobutylamido)titanium $X_n$,
methylphenylsilyl(tetramethylcyclopentadienyl)(cyclopentylamido)titanium $X_n$,
methylphenylsilyl(tetramethylcyclopentadienyl)(cyclohexylamido)titanium $X_n$,
methylphenylsilyl(tetramethylcyclopentadienyl)(cycloheptylamido)titanium $X_n$,
methylphenylsilyl(tetramethylcyclopentadienyl)(cyclooctylamido)titanium $X_n$,
methylphenylsilyl(tetramethylcyclopentadienyl)(cyclononylamido)titanium $X_n$,
methylphenylsilyl(tetramethylcyclopentadienyl)(cyclodecylamido)titanium, $X_n$,
methylphenylsilyl(tetramethylcyclopentadienyl)(cycloundecylamido)titanium $X_n$,
methylphenylsilyl(tetramethylcyclopentadienyl)(cyclododecylamido)titanium $X_n$,
methylphenylsilyl(tetramethylcyclopentadienyl)(sec-butylamido)titanium $X_n$,
methylphenylsilyl(tetramethylcyclopentadienyl)(n-octylamido)titanium $X_n$,
methylphenylsilyl(tetramethylcyclopentadienyl)(n-decylamido)titanium $X_n$,
methylphenylsilyl(tetramethylcyclopentadienyl)(n-octadecylamido)titanium $X_n$,
diphenylsilyl(tetramethylcyclopentadienyl)(cyclopropylamido)titanium $X_n$,
diphenylsilyl(tetramethylcyclopentadienyl)(cyclobutylamido)titanium $X_n$,
diphenylsilyl(tetramethylcyclopentadienyl)(cyclopentylamido)titanium $X_n$,
diphenylsilyl(tetramethylcyclopentadienyl)(cyclohexylamido)titanium $X_n$,
diphenylsilyl(tetramethylcyclopentadienyl)(cycloheptylamido)titanium $X_n$,
diphenylsilyl(tetramethylcyclopentadienyl)(cyclooctylamido)titanium $X_n$,
diphenylsilyl(tetramethylcyclopentadienyl)(cyclononylamido)titanium $X_n$,
diphenylsilyl(tetramethylcyclopentadienyl)(cyclodecylamido)titanium $X_n$,
diphenylsilyl(tetramethylcyclopentadienyl)(cycloundecylamido)titanium $X_n$,
diphenylsilyl(tetramethylcyclopentadienyl)(cyclododecylamido)titanium $X_n$,
diphenylsilyl(tetramethylcyclopentadienyl)(sec-butylamido)titanium $X_n$,
diphenylsilyl(tetramethyleyclopentadienyl)(n-octylamido)titanium $X_n$,
diphenylsilyl(tetramethyleyclopentadienyl)(n-decylamido)titanium $X_n$,
diphenylsilyl(tetramethylcyclopentadienyl)(n-octadecylamido)titanium $X_n$, and derivatives thereof.

By "derivatives thereof", it is meant any substitution or ring formation as described above for structures (Va-f); and in particular, replacement of the metal "M" (Cr, Zr, Ti or Hf) with an atom selected from the group consisting of Cr, Zr, Hf and Ti, and selected from Zr and Hf in a particular embodiment; and replacement of the "X" group with any of $C_1$ to $C_5$ alkyls, $C_6$ aryls, $C_6$ to $C_{10}$ alkylaryls, fluorine or chlorine; n is 1, 2 or 3.

It is contemplated that the metallocene catalysts components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components. In a preferred embodiment, the metallocenes described herein are in their rac form.

The "metallocene catalyst component" useful in the present invention may comprise any combination of any "embodiment" described herein.

Activators and Activation

In certain embodiments, the methods described herein further include contacting either or both of the catalyst components with a catalyst activator, herein simply referred to as an "activator." Preferably, depending on the type of catalyst, the catalyst activator is either a "first activator" or a "second activator", corresponding to its activation of the first and second catalyst components, respectively Alternatively, when contacting bimetallic catalyst, e.g., the Ziegler-Natta catalyst and the metallocene catalyst, the catalyst activator may be an activator composition that is a mixture of the "first activator" and the "second activator." Preferably, activators (particularly the first activator) are present in the polymerization reactor together with the bimetallic catalyst only when the monomers are also present, and polymerization is to be initiated, often once the activator and bimetallic catalyst are combined, the catalyst becomes activated, and is accordingly subject to degradation. The activator, preferably a "first activator" is contacted or otherwise combined with the first catalyst after the first catalyst is modified in one embodiment, and the first activator is contacted simultaneously to contacting the modifier with the Ziegler-Natta catalyst in another embodiment.

The first activator can be any one or a combination of materials commonly employed to activate Ziegler-Natta catalysts, including metal alkyls, hydrides, alkylhydrides, alkylhalides (such as alkyllithium compounds), dialkylzinc compounds, trialkylboron compounds, trialkylaluminum compounds, alkylaluminum halides and hydrides, and tetraalkylgermanium compounds. Preferably, the first activator is trimethyl aluminum (TMA). The amount of the first activator is preferably sufficient to give a molar ratio of activator metal atom (e.g., Al) to the transition metal in the Ziegler-Natta catalyst of about 10:1 to about 1000:1, preferably about 15:1 to about 300:1, and most preferably about 20:1 to about 100:1. Preferably, the first activator is combined with water before or as it is injected into the reactor in order to contact the bimetallic catalyst; the molar ratio of water to first activator metal atom ranges from 0.01 to 5 in one embodiment, and from 0.1 to 2 in another embodiment, and from 0.15 to 1 in yet another embodiment.

The second activator suitable for activating the metal sites in the second catalyst component, for example, the metallocene catalyst, is different from the first activator described above. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that is active with respect to olefin polymerization. More particularly, it is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri(n-butyl)ammonium tetrakis(pentafluorophenyl)boron and/or a trisperfluorophenyl boron metalloid precursors to activate desirable metallocenes described herein. MAO and other aluminum-based activators are well known in the art. Ionizing activators are well known in the art and are described by, for example, Eugene You-Xian Chen & Tobin J. Marks, *Cocatalysts for Metal-Catalyzed Olefin Polymerization: Activators, Activation Processes, and Structure-Activity Relationships* 100(4) CHEMICAL REVIEWS 1391-1434 (2000). The activators may be associated with or bound to a support, either in association with the catalyst component (e.g., metallocene) or separate from the catalyst component, such as described by Gregory G. Hlatky, *Heterogeneous Single-Site Catalysts for Olefin Polymerization* 100(4) CHEMICAL REVIEWS 1347-1374 (2000).

The bimetallic catalyst, e.g., the enhanced support including the Ziegler-Natta catalyst and the metallocene catalyst, may be contacted with the catalyst activator in a number of ways. Preferably, the supported bimetallic catalyst is contacted with a mixture including at least the first and second activators.

Supports

In certain embodiments, an unsupported version of the bimetallic catalyst described herein can be used in a polymerization process, i.e., in which the monomers are contacted with a bimetallic catalyst that is not supported. In other embodiments, a supported version of the bimetallic catalyst can be used. Preferably, the bimetallic catalyst is supported. Supports, methods of supporting, modifying, and activating supports for single-site catalyst such as metallocenes is discussed in, for example, 1 METALLOCENE-BASED POLYOLEFINS 173-218 (J. Scheirs & W. Kaminsky eds., John Wiley & Sons, Ltd. 2000). As used herein, the phrase "supported on a support material", for example, means that the catalyst, activator, etc. is associated with, using any suitable means known in the art, the "support material". The terms "support" or "carrier", as used herein, are used interchangeably and refer to any support material, a porous support material in one embodiment, including inorganic or organic support materials. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and hydroxylated polymers such as polyvinylchloride and substituted polystyrene, functionalized or crosslinked organic supports such as polystyrene divinyl benzene polyolefins or polymeric compounds, and mixtures thereof, and graphite, in any of its various forms. In one aspect of the invention, the support if present, is prepared by heating support particles at a dehydration temperature of up to 600° C., or to 800° C. In another aspect of the invention, the support, desirably an inorganic oxide, is pretreated such as by a fluoriding agent, silylating agent, or by treating with a heterocyclic amine such as an indole compound, either substituted or not.

In one or more specific embodiments, a support is first prepared, preferably in the manner described below; then that support is treated (e.g., combined with ingredients that form the first catalyst) to provide a supported catalyst that includes the first catalyst component. In specific embodiments, that supported first catalyst is then treated in the presence of the second catalyst component to provide a supported bimetallic catalyst.

The support is preferably an inorganic material such as silicon oxide (silica) or aluminum oxide. Preferably, the support material is a dry powder, and in certain embodiments has an average particle size of from 1 to 500 microns, and from 5 to 100 microns in another embodiment, and from 10 to 50 microns in yet another embodiment, and from 5 to 40 microns in yet another embodiment. The surface area of the support ranges from 3 $m^2/g$ to 600 $m^2/g$ or more in one embodiment, and from 100 to 500 $m^2/g$ in another embodiment, and from 200 to 400 $m^2/g$ in yet another embodiment.

The dehydrated support can then be combined with a non-polar hydrocarbon to form a support slurry, which can be stirred and optionally heated during mixing.

A variety of non-polar hydrocarbons can be used to form the support slurry, but any non-polar hydrocarbon selected should remain in liquid form at all relevant reaction temperatures, and the ingredients used to form the first catalyst component are preferably at least partially soluble in the non-polar hydrocarbon. Accordingly, the non-polar hydrocarbon is considered to be a "solvent" herein, even though in certain embodiments the ingredients are only partially soluble in the hydrocarbon. For example, the organomagnesium compound, alcohol and transition metal compound of the first catalyst compound, described in further detail below, are preferably at least partially soluble, and more preferably completely soluble, in that hydrocarbon solvent at the mixing temperatures described above.

Examples of suitable non-polar hydrocarbons include $C_4$-$C_{10}$ linear or branched alkanes, cycloalkanes and aromatics, and oils such as mineral oil or silicon oil. More specifically, a non-polar alkane can be isopentane, hexane, isohexane, n-heptane, octane, nonane, or decane; a non-polar cycloalkane such as cyclohexane; or an aromatic such as benzene, toluene, or ethylbenzene. Mixtures of different non-polar hydrocarbons can also be used.

The support slurry can be heated both during and after mixing of the support particles with the non-polar hydrocarbon solvent, but at the point when either or both of the catalysts are combined with the support slurry, the temperature of the slurry is sufficiently low so that neither of the catalysts are inadvertently activated. Thus, the temperature of the support slurry (e.g., silica slurry) is preferably maintained at a temperature below 90° C., e.g., from 25 to 70° C., or even more narrowly from 40 to 60° C.

Polymerization Processes

As indicated elsewhere herein, the bimetallic catalysts described herein are preferably used to make bimodal polyolefins, i.e., a polyolefin having a bimodal molecular weight distribution. Once the supported bimetallic catalyst is prepared, as described above, a variety of processes can be carried out using that catalyst. Among the varying approaches that can be used include procedures set forth in U.S. Pat. No. 5,525,678, in which those processes are modified to utilize the bimetallic catalysts described herein. The equipment, process conditions, reactants, additives and other materials will of course vary in a given process, depending on the desired composition and properties of the polyolefin being formed. In one embodiment, the polymerization may be carried out in a series of two or more steps and employ the same or differing methods in each step of polymerization; and in a more particular embodiment, the bimodal catalyst is utilized in a single reactor to produce the polymers, desirably bimodal polyethylenes, described herein.

The catalysts and catalyst systems described above, e.g., bimetallic catalysts, can be used in a variety of polymerization processes, over a wide range of temperatures and pressures. The temperatures may be in the range of from −60° C. to about 280° C., preferably from 50° C. to about 200° C., and more preferably from 60° C. to 120° C.; and the pressures employed may be in the range from 1 atmosphere to about 500 atmospheres or higher.

The "polymerization reactor" referred to herein can be any suitable reactor useful for polymerizing olefins, and is not limited to the description herein. Embodiments of suitable polymerization processes include solution, gas phase, slurry phase and a high pressure process or a combination thereof. Particularly preferred is a gas phase or slurry phase polymerization of one or more olefins at least one of which is ethylene or propylene.

In certain embodiments, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms; and even more preferably, the process of polymerization of the invention employs contacting the bimodal catalyst with ethylene and one or more olefin monomers having from 3 to 10 carbon atoms. The invention is particularly well suited to the polymerization of two or more olefin monomers of ethylene with one or more of propylene, 1-butene, 1-pentene, 4-methyl-1-pentene, 1-hexane, 1-octane and 1-decene.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one α-olefin having from 4 to 15 carbon atoms, preferably from 4 to 12 carbon atoms, even more preferably from 3 to 10 carbon atoms, and most preferably from 4 to 8 carbon atoms, is polymerized in a gas phase or slurry process.

In another embodiment of the process of the invention, ethylene or propylene is polymerized with at least two different comonomers, optionally one of which may be a diene, to form a terpolymer.

Typically in a gas phase polymerization process a continuous cycle is employed where in one part of the cycle of a reactor system, the heat of polymerization heats a cycling gas stream, otherwise known as a recycle stream or fluidizing medium, in the reactor. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C., wherein a desirable range includes any upper limit with any lower limit described herein.

Other gas phase processes contemplated by the process of the invention include those described in U.S. Pat. Nos. 5,627,242, 5,665,818 and 5,677,375, and European publications EP-A-0 794 200, EP-A-0 802 202 and EP-B-634 421.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed are preferably liquid under the conditions of polymerization and relatively inert. When a propane medium is used the process must be operated above the reaction diluent critical temperature and pressure. Preferably, a hexane or an isobutane medium is employed.

A particle form polymerization, i.e., a type of slurry process, can be used wherein the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

In an embodiment of the invention, a slurry or gas phase process is used in the presence of bimetallic catalyst of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. Such a process is described in PCT publication WO 96/08520 and U.S. Pat. Nos. 5,712,352 and 5,763,543. In another specific embodiment, the process is operated by introducing a carboxylate metal salt into the reactor and/or contacting a carboxylate metal salt with the metallocene catalyst system of the invention prior to its introduction into the reactor. In yet another embodiment, a surface modifier may be present in the bimetallic catalyst such as disclosed in WO 96/11960 and WO 96/11961.

Bimodal Polyolefin Product

The polymers produced by the processes described herein, utilizing the bimetallic catalysts described herein, are preferably bimodal. The term "bimodal," when used to describe a polyolefin, for example, polyolefins such as polypropylene or polyethylene, or other homopolymers, copolymers or terpolymers, means "bimodal molecular weight distribution," which term is understood as having the broadest definition persons in the pertinent art have given that term as reflected in printed publications and issued patents. For example, a single polymer composition that includes polyolefins with at least one identifiable high molecular weight distribution and polyolefins with at least one identifiable low molecular weight distribution is considered to be a "bimodal" polyolefin, as that term is used herein. Those high and low molecular weight components may be identified by deconvolution techniques known in the art to discern the two components from a broad or shouldered GPC curve of the bimodal polyolefins of the invention, and in another embodiment, the GPC curve of the bimodal polymers of the invention may display distinct peaks with a trough. Desirably, the bimodal polymers of the invention are characterized by a combination of features including the Polydispersity values and Mz values as determined from the GPC curves.

Preferably, other than having different molecular weights, the high molecular weight polyolefin and the low molecular weight polyolefin are essentially the same type of polymer, for example, polypropylene or polyethylene.

Polyolefins that can be made using the described processes can have a variety of characteristics and properties. At least one of the advantages of the bimetallic catalysts is that the process utilized can be tailored to form a polyolefin with a desired set of properties. For example, it is contemplated that the polymers having the same properties as the bimodal polyolefins in U.S. Pat. No. 5,525,678 can be formed.

The bimodal polymers, typically ethylene based bimodal polymers, have a density in the range of from 0.920 g/cc to 0.980 g/cc in one embodiment, preferably in the range of from 0.925 g/cc to 0.975 g/cc, more preferably in the range of from 0.930 g/cc to 0.970 g/cc, even more preferably in the range of from 0.935 g/cc to 0.965 g/cc, yet even more preferably in the range from 0.940 g/cc to 0.960 g/cc.

The bimodal polymers, and in particular, the bimodal polyethylenes of the present invention can be characterized by their molecular weight characteristics such as measured by GPC, described herein. The bimodal polymers of the invention have an number average molecular weight (Mn) value of from 10,000 to 50,000 in one embodiment, and an weight average molecular weight (Mw) of from 80,000 to 800,000. The bimodal polyolefins of the present invention also have an Mz value ranging from greater than 900,000 in one embodiment, and from greater than 1,000,000 in one embodiment, and greater than 1,100,000 in another embodiment, and from greater than 1,200,000 in yet another embodiment. The bimodal polymers have a molecular weight distribution, a weight average molecular weight to number average molecular weight ($M_w/M_n$), or "Polydispersity index", of from 10 to 80 in one embodiment, and from 12 to 50 in another embodiment, and from 15 to 30 in yet another embodiment, wherein a desirable embodiment comprises any combination of any upper limit with any lower limit described herein.

The bimodal polymers made by the described processes can in certain embodiments have a melt index (MI, or $I_2$ as measured by ASTM-D-1238-E 190/2.16) in the range from 0.01 dg/min to 1000 dg/min, more preferably from about 0.01 dg/min to about 50 dg/min, even more preferably from about 0.02 dg/min to about 10 dg/min, and most preferably from about 0.03 dg/min to about 2 dg/min. The bimodal polyolefins of the invention possess a flow index ($I_{21}$ measured by ASTM-D-1238-F, 190/21.6) of from 1 to 40 dg/min in one embodiment, and from 1.2 to 20 dg/min in another embodiment, and from 1.5 to 20 dg/min in yet another embodiment.

The bimodal polymers described herein in certain embodiments have a melt index ratio ($I_{21}/I_2$) of from 20 to 500, more preferably from 40 to 200, and even more preferably from 60 to 150, wherein a desirable range may comprise any combination of any upper limit with any lower limit described herein.

The polymers of the invention may be blended and/or coextruded with any other polymer. Non-limiting examples of other polymers include linear low density polyethylenes produced via conventional Ziegler-Natta and/or metallocene catalysis, elastomers, plastomers, high pressure low density polyethylene, high density polyethylenes, polypropylenes and the like.

Polymers produced by the process of the invention and blends thereof are useful in such forming operations as film, sheet, pipe and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

Example 1

This example describes the preparation of various supported Ziegler-Natta catalysts that were modified; then activated with TMA; and then used in separate polymerization reactions, to produce unimodal polyethylene. The productivities of the modified Ziegler-Natta catalysts (Catalysts B and C) were substantially higher than the productivities of the unmodified Ziegler-Natta catalysts (Catalyst A).

The TMA activator was trimethylaluminum in heptane, and the ethylaluminum sesquichloride (EASC) was in toluene; both were supplied by Aldrich Chemical Company, Inc. The diethylaluminum chloride (DEAC) was in heptane, and the diethylaluminum ethoxide (DEAl-E) was in hexane; both were supplied by Akzo Nobel Polymer Chemicals LLC. Kaydol, a white mineral oil, was purchased from Witco Corporation, and was purified by first degassing with nitrogen for 1 hour, followed by heating at 80° C. under vacuum for 10 hours.

Catalyst A samples (Samples 1-6) represent unmodified Ziegler-Natta catalysts (not activated). Those samples were prepared in the following manner. Davison-grade 955 silica (2.00 g), previously calcined at 600° C. for 4 hours, and heptane (60 ml) were added to a Schenk flask to provide a silica slurry. The flask was placed into an oil bath, which was maintained at 55° C. Dibutylmagnesium (1.44 mmol) was added to the silica slurry (at 55° C.) which was stirred for 1 hour. Then, 1-Butanol (1.368 mmol) was added (at 55° C.), and the mixture was stirred for another hour. Next, $TiCl_4$ (0.864 mmol) was added to the reaction medium (at 55° C.) and the resulting mixture was stirred for 1 hour. The liquid was then removed from the slurry under vacuum to give a white free flowing catalyst powder. Each catalyst sample was then treated with activator. The type of activator used with each Catalyst A sample is reported below in Table 1.

Catalysts B and C represent modified Ziegler-Natta catalysts. Catalyst B samples (Samples 7-11 and 14) were prepared as follows, using an "in-situ" method, meaning that no filtration, washing or isolation was involved in the preparation of the modified Ziegler-Natta catalyst. The modified catalyst was ready to use by simply mixing DEAC or EASC with catalyst A in Kaydol oil for two hours at room temperature. Thus, in a particular embodiment of the present invention, the modified Ziegler-Natta catalysts may be prepared without isolating the Ziegler-Natta catalyst prior to contacting with the modifier.

In preparing each of those samples, a hydrocarbon solution that included modifier was added to a Kaydol slurry of Catalyst A (0.521 g in 13.50 g of Kaydol) at room temperature (25° C.). For Samples 7-11 the modifier was DEAC. For Sample 14 the modifier was DEAL-E. Each resulting mixture was stirred at room temperature for 2 hours, and then used for polymerization. Catalyst C samples (Samples 12 and 13) were prepared as follows, using an "isolation" method, meaning that filtration, washing and drying were involved in the catalyst preparation. In preparing each sample, a hydrocarbon solution that included the modifier (DEAC or EASC) was added to a hexane (40 mL) slurry of Catalyst A (5.02 g) at room temperature. Each resulting mixture was stirred at room temperature for 2 hours and then was filtered, washed twice with hexane (20 mL each), and dried under vacuum at room temperature to yield a light brown free flowing powder.

In each of Samples 1-14, polyethylene was prepared in a slurry phase reactor using the catalysts as specified above and in the Tables below. Kaydol oil slurries that contained each of the catalysts (Samples 1-14) were prepared. For each polymerization, an aliquot of the respective slurry mixture was added to a 50-ml stainless steel bomb containing 50 ml of hexane. The slurry reactor was a 1-liter, stainless steel autoclave equipped with a mechanical agitator. Before polymerization, the reactor was dried by heating at 96° C. under a stream of dry nitrogen for 40 minutes. After cooling the reactor to 50° C., 500 ml of hexane and 40 mL of 1-hexene was added to the reactor, followed by 1.0 ml of TMA in heptane (2.0 mole, as activator). The temperature of the reactor was gradually raised to 85° C., and 90 ml of hydrogen was added (except for Samples 1, 7 and 13). The reactor was then pressured to 200 psi (1,379 kPa) with ethylene. Each premixed catalyst slurry composition was then transferred to the reactor under ethylene pressure. Heating was continued until a polymerization temperature of 95° C. was attained. Unless otherwise noted, each polymerization was continued for 60 minutes, during which time ethylene was continually added to the reactor to maintain a constant pressure. Anhydrous conditions were maintained. At the end of 60 minutes, the reactor was vented and opened. The results of each polymerization run are set forth in Tables 1 and 2 below. The number of grams of catalyst in the tables refers to the weight of the entire catalyst composition exclusive of the oil or other diluent that may be used with the catalyst to aid its addition to the polymerization reactor. The productivity of each polyethylene polymerization run was measured in grams polyethylene produced per gram of supported catalyst (entire bimetallic catalyst, including the support, etc., but excluding the oil or other diluent) per hour.

TABLE 1

Comparative Samples 1-6 of Example 1

| Sample | Cat. | Activator | Catalyst charged (g) | Activator/Ti (mole ratio) | $H_2$ (mL) | Yield (g) | Productivity (g/g) |
|---|---|---|---|---|---|---|---|
| 1 | A | TMA | 0.0314 | 177 | 0 | 90.6 | 2884 |
| 2 | A | TMA | 0.0306 | 182 | 90 | 49.3 | 1611 |
| 3 | A | TMA | 0.0171 | 325 | 90 | 22.1 | 1331 |
| 4 | A | DEAC | 0.0373 | 149 | 90 | 43.7 | 1171 |
| 5 | A | EASC | 0.0404 | 137 | 90 | 8.6 | 213 |
| 6 | A | DEAL-E | 0.0409 | 136 | 90 | 2.1 | 51 |

TABLE 2

Inventive Samples 7-14 of Example 1

| Sample | Cat. | Modifier | Modifier/Ti (molar ratio) | Activator | Catalyst charged (g) | Activator/Ti (molar ratio) | $H_2$ (mL) | Yield (g) | Productivity (g/g) |
|---|---|---|---|---|---|---|---|---|---|
| 7 | B | DEAC | 1.6 | TMA | 0.0092 | 604 | 0 | 99.4 | 10757 |
| 8 | B | DEAC | 0.8 | TMA | 0.01846 | 300 | 90 | 100.2 | 5428 |
| 9 | B | DEAC | 1.6 | TMA | 0.0166 | 335 | 90 | 107.5 | 6451 |
| 10 | B | DEAC | 4.8 | TMA | 0.01835 | 303 | 90 | 88.2 | 4806 |
| 11 | B | DEAC | 8.0 | TMA | 0.0187 | 297 | 90 | 89.3 | 4775 |
| 12 | C | DEAC | 1.6 | TMA | 0.0176 | 316 | 90 | 97.9 | 5562 |
| 13 | C | EASC | 0.86 | TMA | 0.0199 | 280 | 0 | 152.25 | 7651 |
| 14 | B | DEAL-E | 1.49 | TMA | 0.0191 | 291 | 90 | 69.1 | 3618 |

As demonstrated above, the modified Ziegler-Natta catalysts (Catalysts B and C) showed improved catalyst productivities over the unmodified Ziegler-Natta catalysts (Catalyst A). The productivities of Samples 1-6 (Catalyst A) were all below 3,000 g polymer/g catalyst, while the productivities of Samples 7-14 (Catalysts B and C) were all above 3,000 g polymer/g catalyst. Note also that high productivities were obtained for a wide range of aluminum:titanium molar ratios, from a low of 0.8 (Sample 8) to a high of 8.0 (Sample 11). However, the highest productivities were at lower ratios, i.e., molar ratios of 0.8 and 1.6. (See Samples 7-9 and 12-14), while productivities above a molar ratio of 4 (4.8 and 8.0) were lower. Also, it was observed that halogen-containing modifiers (DEAC and EASC) performed better than the ethoxide-containing modifier (DEAL-E).

Example 2

This example demonstrates how catalyst productivity can be affected by contacting an non-activated unmodified Ziegler-Natta catalyst simultaneously with a modifier and activator, rather than first modifying the catalyst followed by activating it. In this example, an aliquot of a Kaydol oil and non-activated Type A Catalyst (0.0191 grams) slurry was formed. This catalyst slurry was formed using the procedure described above in Example 1. The catalyst slurry was introduced to a 50 ml stainless steel bomb containing 50 ml of hexane. Anhydrous conditions were maintained.

The slurry reactor was a 1-liter, stainless steel autoclave equipped with a mechanical agitator. Before polymerization, the reactor was dried by heating at 96° C. under a stream of dry nitrogen for 40 minutes. After cooling the reactor to 50° C., hexane (500 ml) was added to the reactor, followed by 1.0 ml of TMA activator (2.0 moles) in heptane and 0.025 ml of DEAC modifier (0.04 mmoles) and also 1-hexene (40 ml). The reactor was then sealed; and the temperature of the reactor gradually raised to 85° C. The reactor was pressurized to 200 psi (1379 kPa), and ethylene was introduced to the reactor. The pre-mixed catalyst slurry (containing Catalyst A) was then transferred to the reactor under ethylene pressure. Heating was continued until a polymerization temperature of 95° C. was attained. The polymerization continued for 60 minutes, during which time ethylene was continually added to the reactor to maintain a constant pressure. At the end of 60 minutes, the reactor was vented and opened. The results are shown in Table 3 below, productivity expressed as above.

TABLE 3

Polymerization results when combining the modifier and activator simultaneously with the ZN catalyst

| Sample | Cat. | Modifier | Modifier/Ti (molar ratio) | Activator | Catalyst charged (g) | Activator/Ti (molar ratio) | $H_2$ (mL) | Yield (g) | Productivity (g/g) |
|---|---|---|---|---|---|---|---|---|---|
| 15 | A | DEAC | 5.8 | TMA | 0.0191 | 290 | 90 | 44.47 | 2340 |

The results, reported in Table 3, suggest that the greatest boost in activity is seen when the modifier and activator are contacted with the Ziegler-Natta catalyst separately, as reported in Table 2.

Example 3

This example describes the preparation of two different bimetallic catalysts, reflected in Table 4, which were then used in separate polymerization reactions to produce bimodal polyethylene, the results of which are shown in Table 5.

As reflected in Table 4, a "Catalyst D" (Sample 16) was prepared as follows. DEAC (0.1 ml or 0.16 mmol) was added to a slurry of non-activated Catalyst A (0.265 g) in 13.8 grams of Kaydol oil. The resulting mixture was stirred at room temperature for 2 hours. To that slurry was added metallocene, specifically bis(n-butylcyclopentadienyl)zirconium dichloride (($BuCp)_2ZrCl_2$), supplied by Boulder Scientific Company (0.011 g, 0.0272 mmol), along with an activator, i.e., MAO (0.85 ml, 2.64 mmol), and Kaydol (7.2 g). The combined slurry, containing the activated bimetallic catalyst was then mixed and stirred for 2 hours at room temperature, resulting in "Catalyst D."

Also reflected in Table 4 is Catalyst E (Sample 17), which was prepared as follows. A slurry was prepared, that included Kaydol oil (27.4 g) and a DEAC-modified Catalyst C (0.501 g), similar to Sample 12 in Table 2. The slurry also included metallocene, i.e., $(BuCp)_2ZrCl_2$ (0.026 g, 0.0643 mmol) and MAO (1.2 ml, 3.63 mmol). The slurry was stirred for 8 hours at room temperature, resulting in Catalyst E (Sample 17).

The bimetallic catalysts of the present invention possess a molar ratio of Ziegler-Natta transition metal to metallocene metal of from 10:1 to 1:1 in one embodiment, and from 5:1 to 2:1 in yet another embodiment. The molar ratio of aluminum from the MAO activator to metallocene metal ranges from 500:1 to 1:1 in one embodiment, and from 200:1 to 40:1 in another embodiment. Specific values for the examples are shown in Table 4.

TABLE 4

| | | Bimetallic catalysts | | | | |
|---|---|---|---|---|---|---|
| Catalyst | Ziegler Component | Ti loading (mmol/g cat) | Metallocene component | Zr loading (mmol/g cat) | Ti/Zr | Al/Zr |
| D | Catalyst B | 0.221 | $(BuCp)_2ZrCl_2$ | 0.063 | 3.5 | 100 |
| E | Catalyst C | 0.242 | $(BuCp)_2ZrCl_2$ | 0.087 | 2.8 | 56 |

Samples 16 and 17 were used in separate polymerization runs, the results of which are reported in Table 5 below. Each polymerization was conducted in a slurry phase reactor, to produce polyethylene. An aliquot each of Samples 16 and 17 (Kaydol oil slurries) was added to a 50 ml stainless steel bomb containing 50 ml hexane. Anhydrous conditions were maintained. The polymerization time for each run was 60 minutes.

The slurry reactor was a 1-liter, stainless steel autoclave equipped with a mechanical agitator. The reactor was first dried by heating at 96° C. under a stream of dry nitrogen for 40 minutes. After cooling the reactor to 50° C., hexane (500 ml) was added to the reactor, followed by 1.0 ml of TMA (2.0 moles) in heptane. Also added were 30 micro liters of distilled water and 40 ml of 1-hexene. The reactor was then sealed. The temperature of the reactor was gradually raised to 85° C., and 90 ml of hydrogen was added. The reactor was pressured to 200 psi (1379 kPa) with ethylene. The pre-mixed catalyst (described above) was then transferred to the reactor under ethylene pressure. Heating was continued until a polymerization temperature of 95° C. was attained. Polymerization was continued for 60 minutes, during which time ethylene was continually added to the reactor to maintain a constant pressure. At the end of 60 minutes, the reactor was vented and opened. The results of the polymerization are reported in Table 5 below.

TABLE 5

| | Polymerization results of bimetallic catalysts | | | | | |
|---|---|---|---|---|---|---|
| Sample | Catalyst Type | Catalyst charged (g) | Yield (g) | Productivity (g/g) | FI dg/min | PDI (Mw/Mn) |
| 16 | D | 0.0137 | 93.9 | 6803 | 8.1 | 17.9 |
| 17 | E | 0.0137 | 96.3 | 7031 | 2 | 19.2 |

The term "PDI" refers to the Polydispersity Index, which is equivalent to Molecular Weight Distribution Mw/Mn, where Mw is weight average molecular weight and Mn is number average molecular weight, as determined by gel permeation chromatography using crosslinked polystyrene columns; pore size sequence: 1 column less than 1000 A, 3 columns of mixed 5×10(7) A; 1,2,4-trichlorobenzene solvent at 140° C. with refractive index detection. A PDI value of 10 or more is usually suggestive of broad and/or bimodal molecular weight distribution.

Referring to Table 5, the polyethylenes produced using Samples 16 and 17 were each bimodal, that is, they revealed bimodal molecular weight distributions. The polyethylene produced using Sample 16 catalyst had an Mn of 15,597; an Mw of 278,896; an Mz of 1,277,917; and a PDI of 17.9. The polyethylene produced using Sample 17 catalyst had an Mn of 16,862; an Mw of 323,121; an Mz of 1,232,261; and a PDI of 19.2.

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

What is claimed is:

1. A bimetallic catalyst, comprising a support material, a metallocene catalyst compound bound to the support material, and a modified Ziegler-Natta catalyst bound to the support material;
    wherein the modified Ziegler-Natta catalyst is a reaction product of a Ziegler-Natta catalyst comprising a Group 4 or 5 transition metal and a modifier comprising at least one of diethylaluminumchloride or ethylaluminumdichloride to produce a non-activated catalyst;
    wherein the support material has an average particle size from 5 to 100 microns; and
    wherein the molar ratio of aluminum from the modifier to the Group 4 or 5 transition metal is from 0.8 to 1.6.

2. The bimetallic catalyst of claim 1, in which the bimetallic catalyst is non-activated.

3. The bimetallic catalyst of claim 1, in which the bimetallic catalyst is activated.

4. The bimetallic catalyst of claim 1, in which the modified Ziegler-Natta catalyst is a non-activated reaction product of a Ziegler-Natta catalyst that includes titanium and is reacted with a modifier that includes aluminum.

5. The bimetallic catalyst of claim 1, in which the support material is silica.

6. The bimetallic catalyst of claim 1, in which the metallocene catalyst compound comprises zirconium.

* * * * *